United States Patent
King et al.

(10) Patent No.: US 9,195,753 B1
(45) Date of Patent: Nov. 24, 2015

(54) DISPLAYING INTEREST INFORMATION

(75) Inventors: Joseph King, Seattle, WA (US);
Waquas Ahmed, Seattle, WA (US);
William W. Gronim, Seattle, WA (US);
Carl K. Lim, Seattle, WA (US);
Gregory J. Meyers, Newcastle, WA (US); Alexander J. Cox, Seattle, WA (US); Aaron D. Wilson, Seattle, WA (US); Scott Allen Mongrain, Seattle, WA (US)

(73) Assignee: Amazon Technologies Inc., Seattle, WA (US)

( * ) Notice: Subject to any disclaimer, the term of this patent is extended or adjusted under 35 U.S.C. 154(b) by 596 days.

(21) Appl. No.: 11/966,606

(22) Filed: Dec. 28, 2007

(51) Int. Cl.
*G06F 7/00* (2006.01)
*G06F 17/30* (2006.01)

(52) U.S. Cl.
CPC ................. *G06F 17/30867* (2013.01)

(58) Field of Classification Search
CPC .............................................. G06F 17/30867
See application file for complete search history.

(56) References Cited

U.S. PATENT DOCUMENTS

| 5,790,426 | A * | 8/1998 | Robinson ............... 702/179 |
| 6,035,283 | A * | 3/2000 | Rofrano ............... 705/26.41 |
| 6,266,649 | B1 * | 7/2001 | Linden et al. ............. 705/7.29 |
| 6,525,747 | B1 * | 2/2003 | Bezos ...................... 715/751 |
| 7,606,772 | B2 * | 10/2009 | Flinn et al. ................ 706/12 |
| 7,814,048 | B2 * | 10/2010 | Zhou et al. ................ 707/602 |
| 8,001,003 | B1 * | 8/2011 | Robinson et al. ........ 705/14.53 |
| 8,046,237 | B1 * | 10/2011 | King et al. ................. 705/1.1 |
| 2004/0111467 | A1 * | 6/2004 | Willis ...................... 709/203 |
| 2004/0153456 | A1 * | 8/2004 | Charnock et al. ........... 707/10 |
| 2005/0055306 | A1 * | 3/2005 | Miller et al. ............... 705/37 |
| 2006/0178918 | A1 * | 8/2006 | Mikurak ..................... 705/7 |
| 2006/0218179 | A1 | 9/2006 | Gardner et al. |
| 2006/0282304 | A1 * | 12/2006 | Bedard et al. .............. 705/10 |
| 2007/0043583 | A1 | 2/2007 | Davulcu et al. |
| 2007/0078832 | A1 * | 4/2007 | Ott et al. ..................... 707/3 |
| 2007/0143298 | A1 | 6/2007 | Surendran et al. |
| 2008/0133417 | A1 * | 6/2008 | Robinson .................. 705/52 |
| 2008/0222100 | A1 * | 9/2008 | Chiu ............................. 707/3 |

OTHER PUBLICATIONS

Tag Forums Generated and Linked on Tag Page, Release date Sep. 2006, 1 pg.

* cited by examiner

*Primary Examiner* — Loan T Nguyen
(74) *Attorney, Agent, or Firm* — Lee & Hayes, PLLC (57) ABSTRACT

Displaying communities associated with personalized data provides a user with access to relevant communities based on the user's activity with an electronic catalog. The communities include content which may be manipulated by user activity or non-user activity. The communities may facilitate user discussion or viewing of information related to the user's interests. The communities may be associated with elements associated with user interaction and/or based off recommended elements or categories associated with the user. Communities may be ranked or scored to improve the relevancy of the community for the user. Communities may be displayed with, for example, a personalized page for the user that may include other user recommendations, or the communities may be associated with other personalized pages within a website, among other possibilities.

23 Claims, 9 Drawing Sheets

DISPLAYING INTEREST INFORMATION

BACKGROUND

Some websites provide customized content that is dependent upon, for example, an identification of a particular user. For example, search engine portals may look at user search strings, potentially along with other user information, and generate customized advertisements that are relevant to the user. In the case of e-commerce websites, for example, user behavior may be analyzed to, for example, generate recommendations of items the user might like to purchase or view based on the user's activity.

Online communities are often formed around users that have common interests. Such communities may include various ways of interacting among its users, such as by using online chats, discussion forums or tagging interfaces. Such communities may be formed on various websites such as social networking websites, search engines, and e-commerce websites. Users may choose which community features they are interested in, such as by subscribing to an email list or manually selecting which community features are to be displayed within a user interface.

However, despite the conventional approaches to customizing content for users, there remains a need to improve user access to community features of websites.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Embodiments of the present disclosure are directed to, among other things, selecting customized presentations of communities and/or community content for display to a user. For example, the customized presentation may be based on information known about the user such as, among other possibilities, the behavior of a user on the website or other websites, the location of the user, user input, and/or information related to the user's client (e.g. operating system, web browser software, etc.). The user behavior may be based in part on user interaction with particular elements made remotely available, such as over a wide area network (e.g., the Internet) or available by another distributed communication. As an overview, elements may include products, services, sellable or rentable units, user profiles, user-created content (e.g., artwork), or anything else that may be available to users of a website.

Although elements may be tangible objects (e.g. items for sale in a catalog) or intangible objects (e.g. social network profiles), elements can also be any abstract topic for which a community is built upon. For example, the element may be a topic like "History" or "Hockey".

In addition, the elements may be grouped or otherwise associated with one or more categories and/or tags. For example, an element may be a book under a category "romance novel" with a tag "best seller." The book may be associated, either directly or indirectly, with other categories or tags. For clarification, tagging enables a community of users or other entities to define and assign different tags to the elements. Tags are user-generated metadata about the elements. In other words, tags are pieces of information separate from, but related to, the elements. In a collaborative environment, the tags are descriptors that may be freely chosen by different users to characterize or otherwise describe attributes of the elements, rather than having the description controlled by a centralized classification process. The tags can specify properties of an element that may not otherwise be obvious from the element itself and/or which may have special meaning only to the user or a subset of users. Once assigned to elements, the tags may then be used to locate the elements, for example, via a tag search. Although embodiments are described as having text based tags, other types of tags can be used, including icons, photos, and/or video clips, for example. In contrast, categories typically create a hierarchical organization of a catalog of elements and are often created and/or managed by, for example, an e-commerce website. It follows that elements, tags, and categories may be cross referenced to create a web of information in an electronic catalog.

A website may include web pages, each providing information on one or more of an element, tag, or category. Each web page may further include information, cross references, and access to various communities associated with the element, tag, or community that is featured on the web page. Communities may be topics of interest that bring together people, discussions, user provided content, and/or editorial content into a common location. Communities may include multiple types of content, including but not limited to images, videos, blog posts, RSS feeds, reference articles, wikis, polls, discussion threads, forums, subscriptions, groups, membership, clubs, or other user driven aspects of the website.

Generally speaking, community content ("content") includes user provided content, editorial content, and non-user content. In some implementations, content has relevance and a quality ranking within a community. Further, content may be surrounded by a volume of activity, such as user activity with the content or non-user activity. In some instances, content may belong to more than one community, thus making the content shared between multiple communities.

Although any type of community and/or community content, may be displayed based on user interest information as described herein, an illustrative example of displaying communities follows which describes displaying a forum. A forum may be an online discussion board where users can exchange messages (usually text-based) via posts or entries on a discussion topic, typically continued in a dialogue format on the message board. In some instances, the forum may facilitate exchanging and viewing images (e.g., videos, icons, or other graphical imagery) or exchanging and/or playing audio/video clips or exchanging data or files. Users may either contribute to the discussion or they may read other people's entries to gain insight on the discussion topic. The forum may have an associated forum web page to display the forum and allow users to interact on the forum.

The forum may include one or more discussions. Each discussion may be created, in whole or in part, based on topics related to an element and the particular category and/or tag associated with the element. As a result, the discussions may be related to aspects of the element, tag, or category. In some instances, the forum may be a general forum for discussing an element, a variety of elements associated with a tag, or a variety of elements associated with a category. Forums may also be categorized at other varying levels of granularity, or otherwise.

The website may also include user personalization information, based at least in part on user interaction with elements on the website and/or user interaction with other features of the website. For example, the website may enable users to sign in (or log on) to a profile or account, thus allowing the website to track the user's interactions. Depending on the content hosted by the website, the user interactions may include product views, search requests, product purchases, tagging activity, participation in forum discussions, or the like. The user interactions may be analyzed and transformed to create recommendations for the user, among other potential uses. In some embodiments, the website may host one or more dynamically personalized web pages. In the context of an e-commerce website this may include personalized information including and not limited to recommendations for items, recommendations for categories of items the user may like, and comparisons of items from other users having similar user behavior.

Forums containing active discussions may be selectively displayed on web pages displayed throughout a website (automatically or by an administrator). The placement may strategically allow users to access forums that may pertain to their interests most closely while avoiding over-placement of the forums that may clutter websites and distract users from more relevant information or services. The personalized web pages may also include these communities, such as the discussions included in the forums that may surface from other locations within the website. For example, an analysis of user behavior may indicate that a particular user enjoys reading about post-modern art and therefore may generate a link to an active discussion related to post-modern art to at least one of the user's personalized web pages.

For purposes of discussion, displaying interest information is described in the context of an item catalog hosted by a merchant website. One illustrative implementation of this context is provided below. However, it should be appreciated that the described techniques may be implemented in many other contexts such as, but not limited to, social networking websites, search engine websites, and informational websites. Additionally, there is no need that there be additional underlying content (e.g. products, social profiles, etc.) beyond the community content itself. As described above, in such a case, the underlying elements can be abstract subjects, such as "History" or "Modern Art". Moreover, other personalization techniques may be performed by the illustrated architecture.

Illustrative System Architecture

Figure 1:
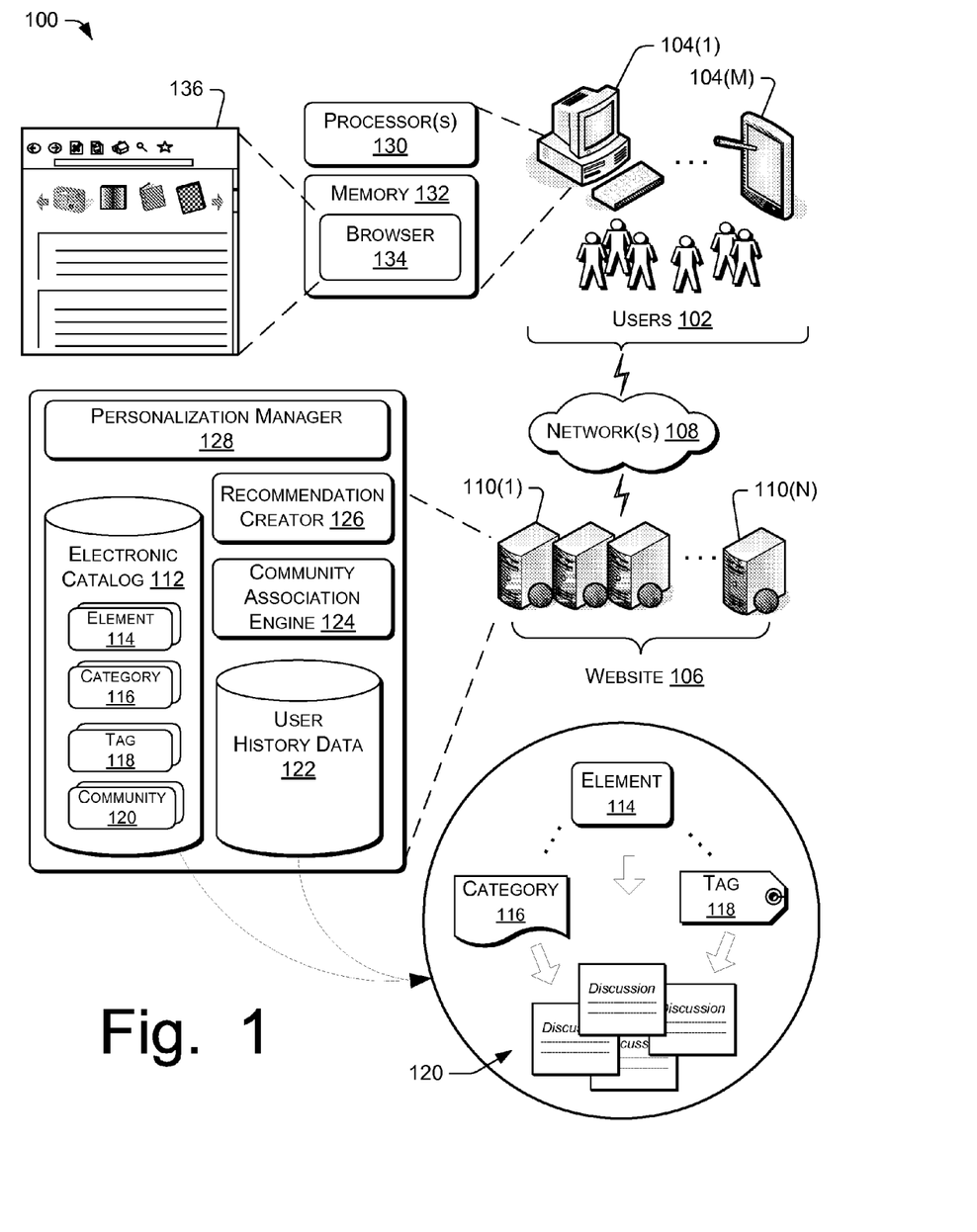
FIG. 1 illustrates an example architecture for selecting communities based on personalization data associated with an electronic catalog of items. The architecture includes multiple clients coupled via a network to a server system that hosts the electronic catalog.

FIG. 1 illustrates an example architecture 100 for selecting communities based on personalization data. For example, the personalization data can be associated with a user of an electronic catalog of items. In the architecture 100, the users 102 may utilize user computing devices 104(1), . . . , 104(M) to access a website 106 via a network 108. The network 108 represents any one or combination of multiple different types of networks, such as cable networks, the Internet, and wireless networks.

One or more servers 110(1), . . . , 110(N), perhaps arranged in a cluster or as a server farm, host the website 106 or another type of information server. Other server architectures may also be used to host the website 106. The website 106 is capable of handling requests from many users and serving, in response, various web pages that can be rendered at the user computing devices 104(1)-(M). The website 106 can be any type of website that supports user interaction, including online retailers, informational sites, social networking sites, blog sites, search engine sites, news and entertainment sites, and so forth.

In the illustrative environment, the website 106 represents a merchant website that hosts an electronic catalog 112 with one or more element records 114, which represent an underlying element. Due to this relationship, the term "element" and "element record" may be used interchangeably throughout. The elements 114 include anything that the merchant wishes to offer for purchase, rental, subscription, viewing or some other form of consumption. In some embodiments the elements 114 may be offered for consumption by the merchant. However, in some embodiments the merchant may host elements 114 that other entities are selling using the merchant's website. In embodiments, the elements 114 include a product, a service, a digital download, a news clip, a user profile, user-created content, information, or some other type of sellable or non-sellable unit.

In FIG. 1, the electronic catalog 112 also stores a collection of categories 116, tags 118, and communities 120. The electronic catalog 112 is accessible, directly or indirectly, by one or more of the servers 110(1)-(N). Each element record 114, meanwhile, represents an associated item being offered for sale or other consumption on the website 106 and contains information about the associated item, such as an association with a tag, category, and/or community. For products such as books or music CDs, for example, the element record may contain a description, images of the product, author/artist names, publication data, pricing, shipping information, and so forth. For other types of elements, the element record may contain different information appropriate for those elements.

In embodiments, the website 106 includes user history data 122 that includes data relating to user interactions on the website. The user history data 122 may include, among other possibilities, user item views, user item purchases, purchase history, browsing history, community interactions, tag use or creation, or other user interactions on the website 106. If available, the user history data 122 may even include activity associated with interactions with websites other than website 106.

A community association engine 124 may link the user history data 122 with information in the electronic catalog 112 to create references between the user history data 122, the elements 114, the categories 116, and the tags 118. The community association engine 124 may further enable providing associations between communities 120 and the elements 114, the categories 116, and/or the tags 118. For example, the user history data 122 may indicate user interest in a particular element 114, such as a digital camera. The community association engine 124 may link the digital camera with a category and/or tag, which may then be associated with a community. Thus, the community association engine 124 may extract user history data 122 to associate communities 120 with a user. In some embodiments, the user history data 122 may include community interaction, or interaction with tags and/or categories.

Website 106 may also have access to a recommendation creator 126, which may use the user history data 122 as an input to generate recommendations for the user. For example, the recommendation creator 126 may generate recommended elements, categories, and/or tags, which may be further used as inputs by the community association engine 124 to associate communities with the user history data 122.

In illustrative embodiments, a personalization manager 128 facilitates the creation and presentation of personalized user web pages on the website 106. The personalization manager 128 may initially identify the user, such as by receiving user log in information or by determining whether a previously stored cookie associated with the user is accessible by the user's web browser. If the user is identified by the personalization manager 128, one or more web pages may be generated which contain personalized information for the user. For example, one personalized page may contain recommendations of elements and categories, as generated by the recommendation creator 126 based on the user history data 122. In addition, the community association engine 124 may associate communities, such as discussions, with the personalized page to provide the user with easy access to relevant communities which may interest the user. In one embodiment, the personalization manager 128 may generate a personalized web page with a specific user theme, such as a "my page" where the page includes recommendations and communities which are associated with the user based on the user's interaction on the e-commerce website 106, as recorded in the user history data 122.

As discussed above, one or more of the users 102 may navigate through the e-commerce website 106 and perform a number of tasks including searching, viewing, comparing, and discussing elements on the website 106, all of which contribute to the user history data 122. To search, the users 102 may utilize the user computing devices 104(1)-(M) (also referred to as "client computers" or simply "clients"). The user computing devices 104(1)-(M) may be implemented as any number of computing devices, including as a personal computer, a laptop computer, a portable digital assistant (PDA), a mobile phone, a set-top box, a game console, and so forth. As illustrated, each user computing device is equipped with one or more processors 130 and memory 132 to store applications and data. According to some embodiments, a browser application 134 is shown stored in the memory 132 and executes on the processor 130 to provide access to the website 106. The browser application 134 renders web pages served by the website 106 on an associated display. Although embodiments are described in the context of a web based system, other types of client/server-based communications and associated application logic could be used (e.g., a cable-tv head-end and television set-top box environment, a digital video recorder with corresponding remote service provider, a mobile device and corresponding remote service provider, among other possibilities).

When a user (e.g., one of the users 102) accesses the website 106, the user computing device 104(1) submits a request, such as in the form of a uniform resource locator (URL), to the servers 110(1)-(N). Upon receiving the request, the servers 110(1)-(N) return a personalized web page 134 back to the requesting client computer. In the context of a merchant website, a returned personalized web page 136 may allow the user to view or contribute to the communities 120 associated with the user history data 122 generated by the user.

Community Associations

Figure 2:
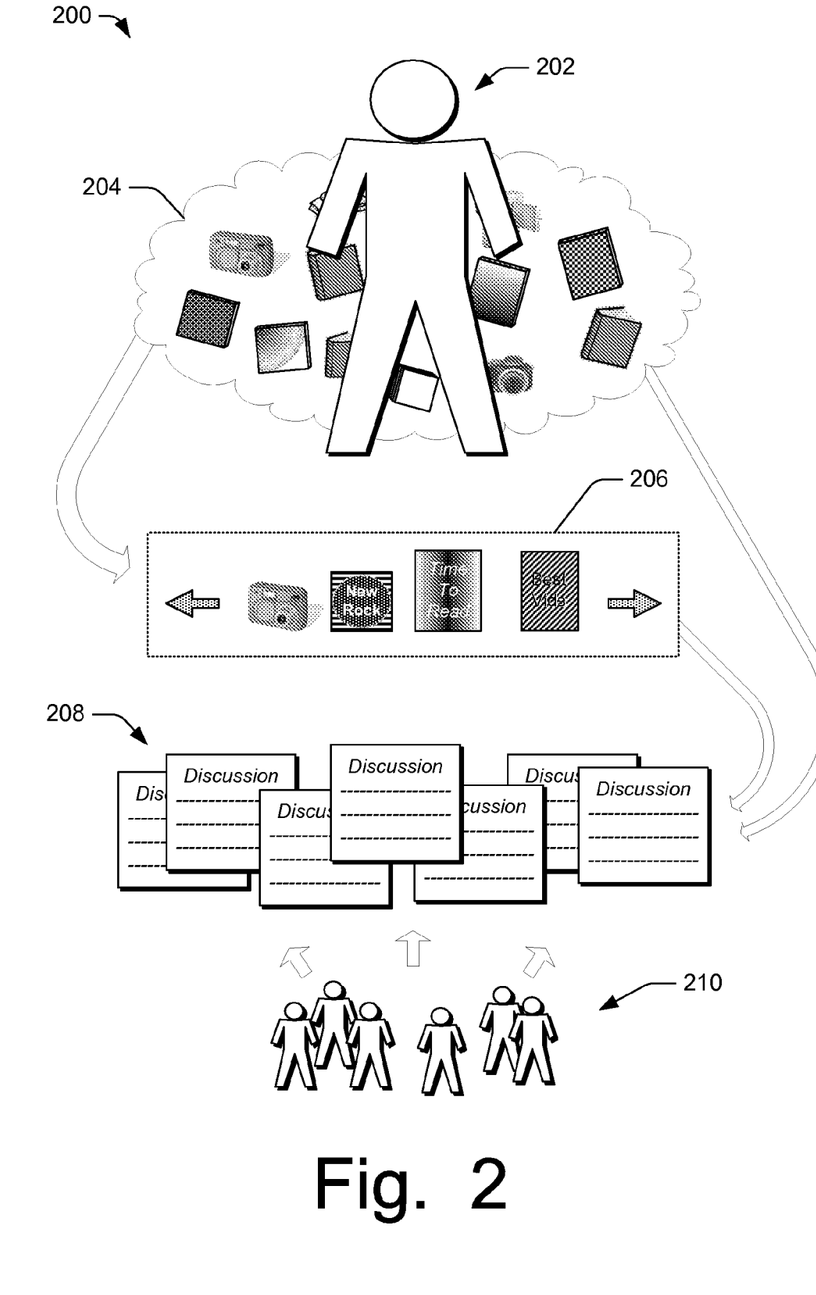
FIG. 2 illustrates user elements and personalized data associated with a specific user. The user elements and/or the personalized data are associated with communities that may be created, viewed, and modified by a group of users.

FIG. 2 is an illustrative environment 200 including user elements and personalized data associated with a user 202. The architecture 100, described in FIG. 1, may generate the illustrative environment 200. As illustrated, the user 202 may be associated with a data collection 204. In some implementations, the data collection 204 includes the elements 114, the categories 116, and/or the tags 118 used by or associated with the user 202, as previously described with reference to FIG. 1.

More specifically, the data collection 204 may be populated after a user interacts on the website 106, such as by clicking thorough web pages and viewing elements. In accordance with embodiments, the data collection 204 may be populated by elements that are purchased, elements placed in a shopping cart (or otherwise designated for a later action), elements rated by the user 202, elements included on a user list (e.g., registry or wishlist), and/or elements that were recently viewed by the user 202. In addition or alternatively, the data collection 204 may include recent search terms, reviewed elements, and recently viewed communities such as forums and discussions.

In an example, the user 202 may visit the webpage 106 and begin to search for a camera. The user 202 may use a search term, read camera reviews, click through element pages and tags, and ultimately purchase a camera. The user's interactions on the website 106 may be stored as user history data 122 to define the data collection 204, a subset of the user history data.

In accordance with embodiments, the recommendation creator 126 may use the data collection 204 to generate a recommended collection 206. The recommended collection 206 may include recommended elements, categories, tags, or other recommended items. For example, the user 202 may buy two audio CDs of a particular artist, which may exist in the user's data collection 204. The recommendation generator 126 may associate these two audio CDs with the artist, who has a third CD, which in turn may be included in the recommended collection 206. Other techniques may be used to populate the recommended collection, such as CDs purchased by other users who also purchased the two audio CDs purchased by the user 202. In addition, elements may be associated with tags and/or categories (or vice versa), which in turn may create additional recommendations.

The community association engine 124 may use the recommended collection 206 and/or the data collection 204 to determine recommended communities 208, such as forums and/or discussions for display on a personalized page for the user 202. In some instances, communities may be directly associated with the user history data 122 while in other instances, the recommended collection 206 and/or the data collection 204 may be transformed or otherwise manipulated to associate a community with the user. For example, a recommended category may not have an associated community, but may be transformed to a tag having similar elements and that includes a community.

The recommended communities may enable the user 202 to engage, interact, or view communities with other participants 210. The recommended communities may be filtered, or otherwise ranked to present the most relevant, passionate, updated communities to the user 202 on a personalized web page, thereby increasing the likeliness of user interest in the recommended communities 208. In one embodiment, the community association engine 124 may select and present to the user 202 the most active discussions for the recommended collection 206, while ensuring that the discussions cover a portion of the diversity of the data collection 204 and/or the recommended collection 206.

Figure 3:
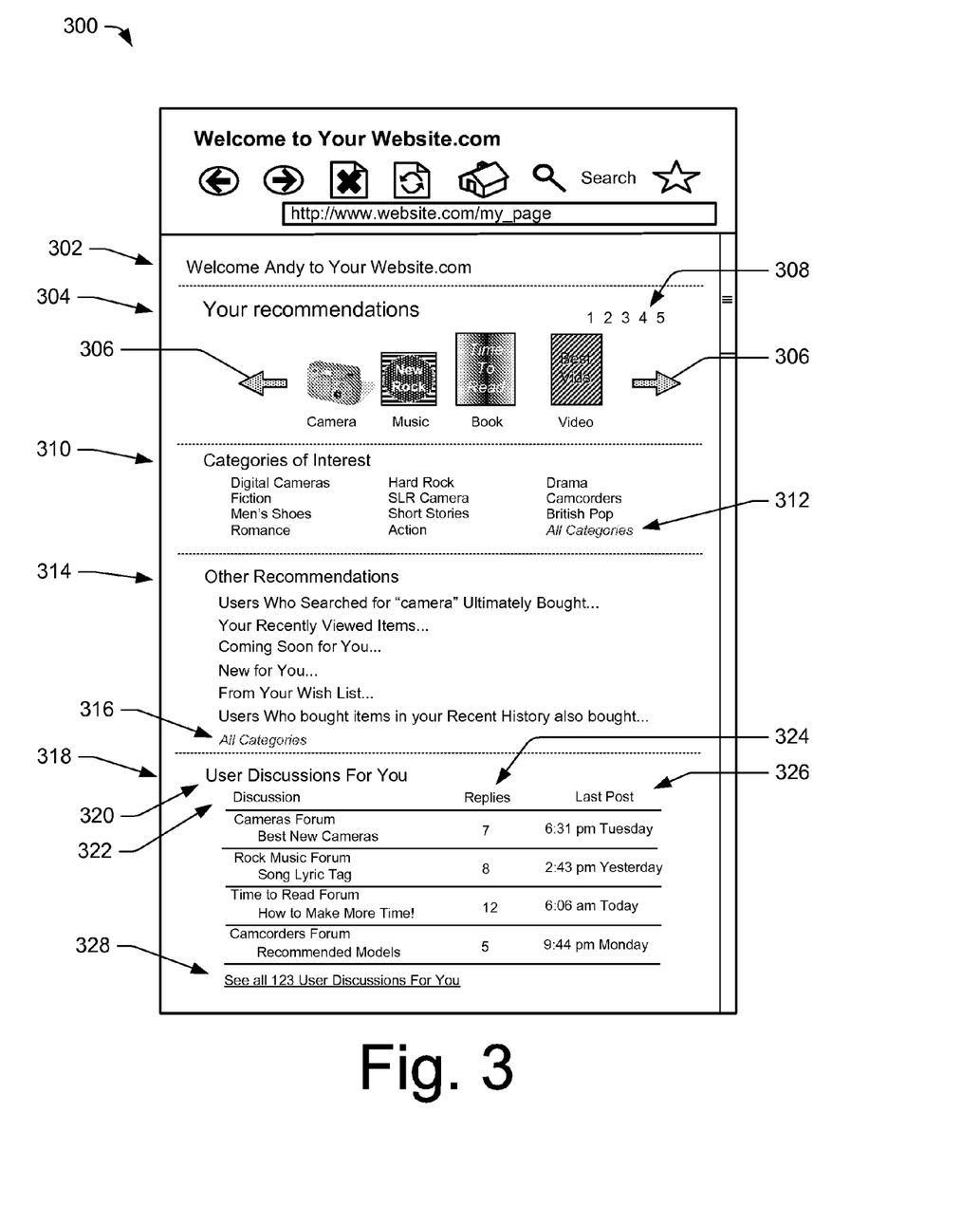
FIG. 3 illustrates an example screen rendering of a personalized page. The personalized page includes personalized recommendations based on user history and communities associated with the user history and/or the recommendations.

FIG. 3 illustrates an example screen rendering of a personalized page 300. The personalization manager 128 generates the personalized page 300, which includes personalized recommendations based on user history and communities associated with user history and/or recommendations. Each user, such as user 202, may have her own personalized page 300 where the user may access information about her account, personalized lists, orders, previous purchases, and the like. The personalized page 300 may also include access to the recommended collection 206 and recommended communities 208. In an example, the personalized page 300 may have the URL "http://www.website.com/my_page", which may be the web page for personalized information. The user may log in or otherwise transmit data, either directly or indirectly (e.g., via a cookie) to identify the user such that personalized data can be generated and displayed within the personalized page 300.

The personalized page 300 may include a title pane 302 with a title or other informative text. In some embodiments, the personalized page may be divided into portions for displaying groups of information. For example, one group of information may be element recommendations 304. The element recommendations 304 may present some or all of the recommended collection 204. In an implementation, the element recommendations 304 display a portion of the recommended collection 204, while enabling the user 202 to click arrows 306 and/or links 308 to access additional elements in the recommended collection. Another group of information may include category recommendations 310. In an implementation, the category recommendations 310 display a portion of the categories in the recommended collection 204. The user 202 may access all of the category recommendations 310 by clicking a link 312. Additional implementations may include presenting tag recommendations or other recommendations created by the recommendation creator 126 and residing in the recommended collection 204.

With continued reference to FIG. 3, other recommendations 314 may be presented in yet another group of information on the personalized page 300. The other recommendations 314 may include without limitation elements, tags, and/or categories associated with other user interactions. For example, one recommendation may be items bought by other users who searched for a similar term as the user 202. Another recommendation may include items bought by other users who previously bought items matching recently viewed items of the user 202. In fact, an entire variety of associations, or similarities, may be created by comparing user history data 122 from the user 202 with interaction by other users (e.g., purchases, product views, personalized list placements, people associations, posts, cart additions for a checkout, etc.) on the website 106. User actions including recently viewed elements and elements from personalized lists may also be presented to the user 202. In addition, recommendations such as "new for you" and "coming soon for you" may be presented in the other recommendations 314. In some embodiments, the other recommendations 314 may include images of the elements associated with the recommendations and enable the user 202 to click the element to access an element web page. The user 202 may access all of the other recommendations 314 by clicking a link 316.

Community recommendations 318 may be a final group of information presented to the user 202 on the personalized page 300. The community recommendations 318 may include forums, discussions, or other community items. In an implementation, the community recommendations 318 include discussions with recent activity that is associated with the recommended collection 204. The community recommendations may include a number of fields to describe and/or sort the communities, such as a title 320, a description 322, a quantity of replies 324 (or posts), and a most recent post indicator 326 (last post). The description 322 may indicate the name of the discussion along with its associated forum. For example, a discussion entitled "Best New Cameras" may be included in a forum called "Cameras." In embodiments, the community recommendations 318 list a portion of the recommended communities 208. The user 202 may access additional community recommendations 318 by clicking a link 328.

Figure 4:
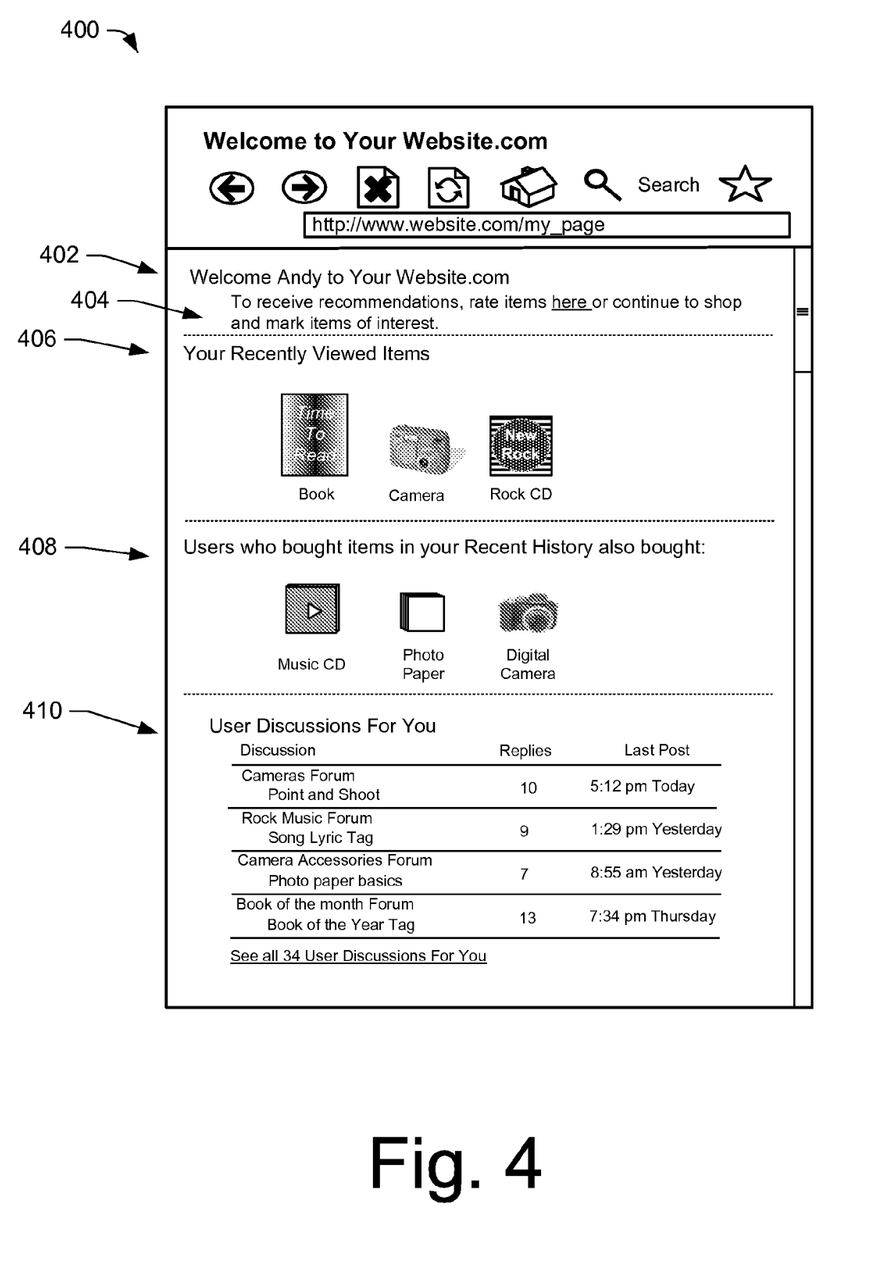
FIG. 4 illustrates another example screen rendering of a personalized page. The personalized page includes recent user activity and relations from other users based on the recent user activity. Communities are associated with the recent activity and/or the relations.

FIG. 4 illustrates an example screen rendering of another embodiment of a personalized page 400. The personalized page 400 may be presented to a user, such as the user 202, who is identified by the e-commerce company but does not have enough website interaction to create the recommended collection 204.

In embodiments, the personalized page 400 may include a title 402 and a link section 404 to assist the user 202 in creating data to enable the recommendation generator 126 to create recommendations. The personalization manager 128 may generate additional sections on the web page that include elements, categories, and/or tags of interest to the user 202. For example, a recently viewed items section 406 may include elements that the user 202 has recently interacted with on the website 106. A similarities section 408 may associate information from the user 202 with other users, such as to present elements bought by other users who also bought elements in the recent history of the user 202.

In accordance with embodiments, a community recommendation section 410 may be presented on the personalized page 400. The community recommendation section 410 may be populated from recommended communities 208, which may be based off the data collection 204. In some instances, the data collection 204 may only contain recently viewed elements, categories, and/or tag, particularly if the user 202 recently began using the website 106.

Figure 5:
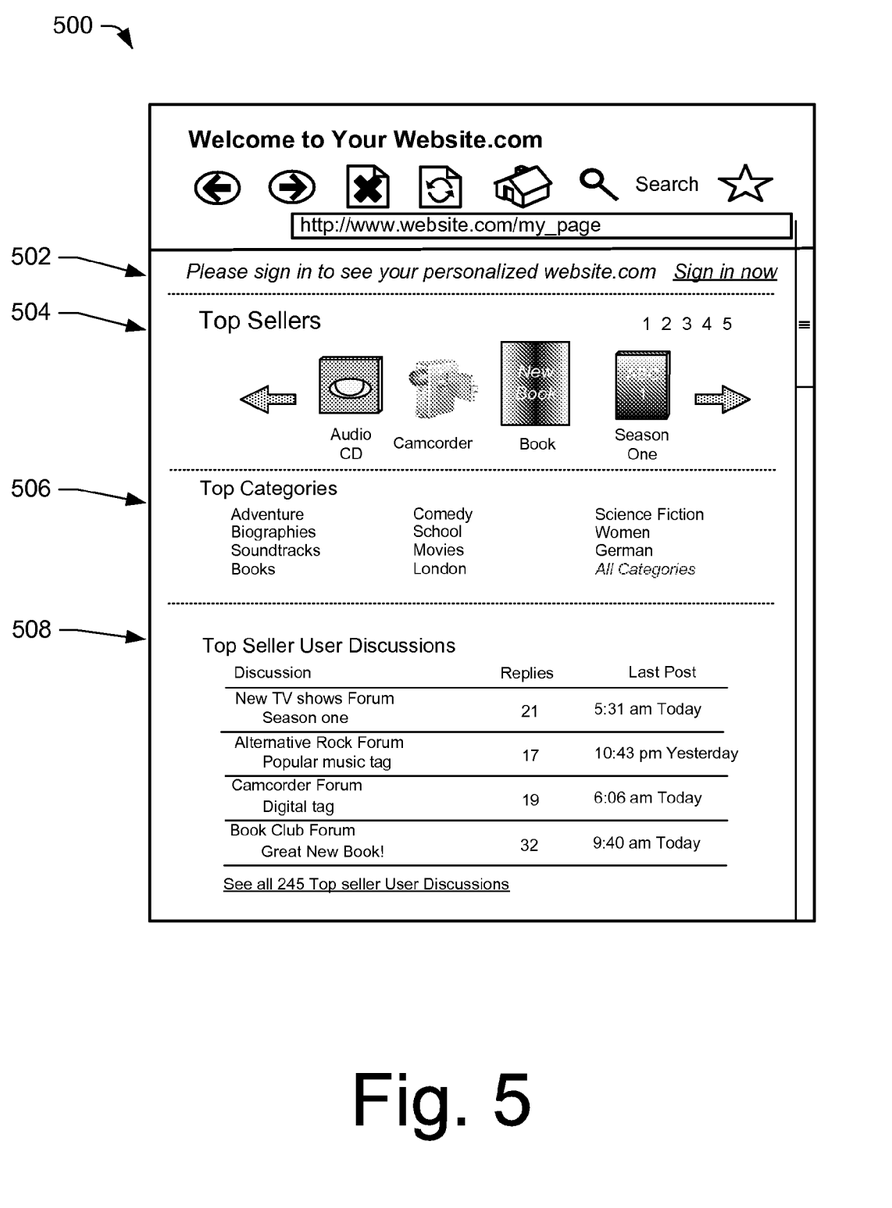
FIG. 5 illustrates an example screen rendering of a personalized page without a login. The personalized page includes top seller elements, categories, and communities associated with the top seller elements and/or the categories.

FIG. 5 illustrates an example screen rendering of a personalized page 500 which can, for example, be used at times when the user 202 is not associated with the website 106. For example, the user 202 may not have an account with the website 106, or another identifier that enables an association of user history data 122 from the website with the user 202 may not be present. However, the personalized page 500 may include information relating to the user, such as by providing options for a user selection that result in a display of associated content. Alternatively or additionally, the personalized page 500 may include information about the user from sources other than the website 106, such as information based on the user's IP address, time of day, browse history on other websites (e.g., upstream browsing history), or other related information that may be captured about the user by the website.

The personalized page 500 may include a header 502 which indicates that the user 202 is not identified by the website 106. A top seller elements section 504 may present a portion of the best seller elements, enabling the user 202 to view popular elements. In addition, a top categories section 506 may be presented to enable the user to identify top categories. Other embodiments may include additional sections that provide data, such as a top tag section. A top seller community section 508 may include communities associated with the top seller elements, top categories, and/or the top tags on the website 106. Additionally, or alternatively, the top communities may be presented in the top seller community section 508.

Personalized Community Selection

Figure 6:
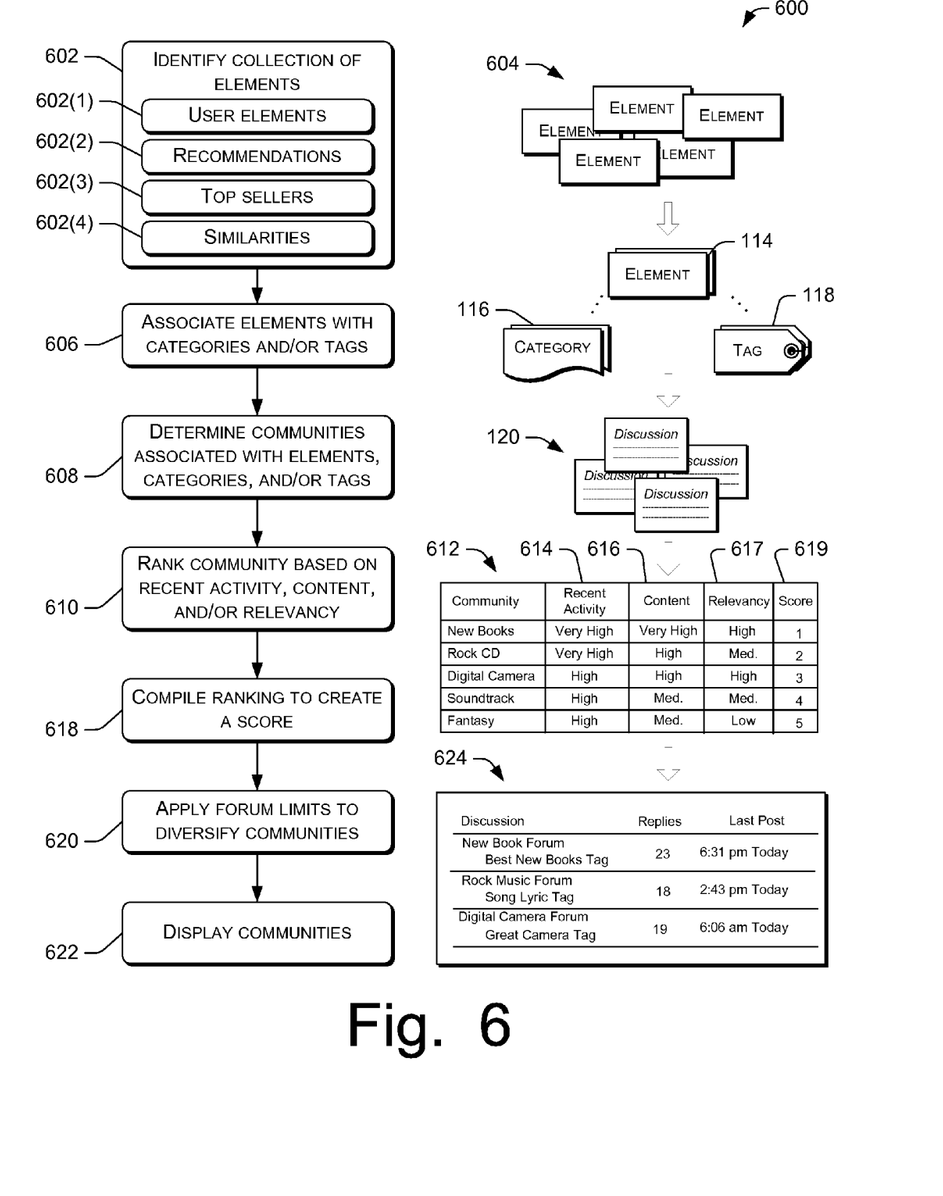
FIG. 6 is a flow diagram of an illustrative process for determining communities that are associated with personalized data and how to select and display the communities.
Figure 7:
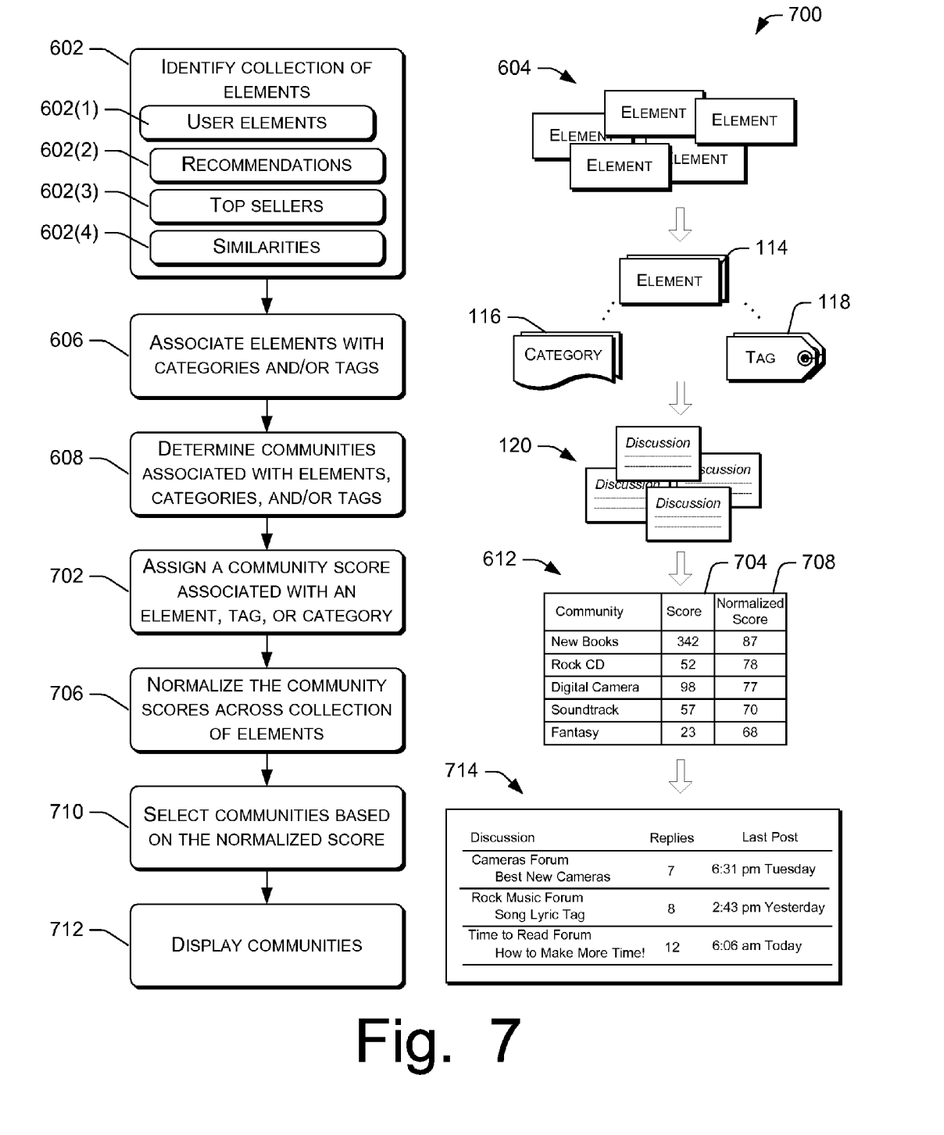
FIG. 7 is a flow diagram of another illustrative process for determining communities that are associated with personalized data and how to score, select, and display the communities.

FIG. 6 and FIG. 7 present illustrative processes for determining communities to generate and/or display to a user from personalized user data. The processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes associated with FIG. 6 and FIG. 7 are described with reference to the architecture 100 of FIG. 1. In particular, many acts described below may be implemented and performed by the community association engine 124, the recommendation creator 126, and the personalization manager 128 in association with the electronic catalog 112 and the user history data 122.

FIG. 6 is a flow diagram of an illustrative process 600 for determining communities that are associated with personalized data, and for determining how to select and display these communities. In accordance with embodiments, user information is obtained at 602 from the user history data 122 to identify a collection of elements. The user history data may include occurrences of user history, which may include one or more of the following subsections 602(1), . . . , 602(4). At 602(1), user elements 114 may be identified and used to associate communities with the user 202. The user history data 122 may be used by the recommendation creator 126 to create recommendations at 602(2). In addition, top sellers (at 602(3)) and similarities (item and tag similarities) (at 602(4)) may be associated with user history data and may be used to associate communities with the user 202. The terms "recommendations" and "similarities", among other terms used herein, may be more fully described in U.S. Pat. No. 6,266,649 entitled "Collaborative Recommendations Using Item-To-Item Similarity Mappings" issued on Jul. 24, 2001 and in U.S. patent application Ser. No. 11/281,886 entitled "Recommendations Based On Item Tagging Activities Of Users" filed on Nov. 17, 2005. The elements identified at 602 from subsections 602(1)-602(4) are represented by the collection of elements 604. In further implementations, tags, categories, communities, and other user history data may be represented with the collection of elements 604.

The community association engine 124 may associate elements with categories and/or tags at 606. For example, the element 114 may be associated with the category 116 of the element and the tag 118 that has been associated with the element. The category 116 and/or the tag 118 may be used by the community association engine 124 to determine communities 120 associated with the element 114, as shown at 608. In some instances, only the more popular tags associated with elements may be used in the association at 608. For example, the element 114 may have many of the tags 118, but only the top three tags are used for associating the element 114 with the communities 120. Tags may also be selected randomly, or in any other manner. Additionally, the tags 118 may be transformed, or otherwise manipulated, such as to link the tags with similar categories, thus creating additional categories which may be used to associate the elements 114 with the communities 120.

The collection of the communities 120 that are associated with the elements 604 may be analyzed for relevancy or other metrics to enable the personalization manager 128 to present the most relevant communities to the user 202. At 610, the communities 120 are ranked based on recent activity, content, and or relevancy, each discussed in turn.

In an embodiment, recent activity may be determined by the date of the last post, the number of posts during a recent interval, or by other techniques. For example, a discussion may be designated as active if it has recent activity in the last week (or other time period).

The communities may be ranked based on community content at 610. Community content may include the quality of the content within a community. For example, a community may be analyzed to determine the quality of the content based on the number of entries (e.g., posts) in the community, words, views or interactions, or other metrics which may determine a quality for the content of the community.

Finally, communities may be ranked based on relevancy at 610. For example, categories may be associated with a customer using various data including source data (e.g., elements customer has interacted with) and personalized data derived from the source data. Different types of data relations may create stronger relevancy for a community. Various techniques may be used to determine which associations create the most relevant communities. In an embodiment, historical data may be examined in order to determine which categories of source data and/or personalized data were more attractive to customers, thus creating a stronger relevancy. For example, an element that a user interacted with may be more relevant to provide community associations than an element that was recommended to the user. In addition, or alternatively, data may be dynamically analyzed to enable a system to automatically adapt relevancy ranking as customer behavior changes, which in turn changes the relevancy of communities. Thus, generally speaking, relevancy includes ranking a community based on an element, tag, and or category used to locate the community.

A community database 612 may be used to store the communities and related information. The community database 612 may include a field for a recent activity 614, a field for a content rank 616, and/or a field for a relevancy rank 617. In implementations, the community association engine 124 may compile a ranking of the communities in the community database 612 based on recent activity, content, and/or relevancy at 618. A ranking score 619 may be included in the community database 612, which may reflect a compilation of the recent activity, content, and/or relevancy ranks. The ranking score 619 may be an ordered list of the most desirable community (rank=1) to the worst community, or the ranking score may be a numerical value that is not based on consecutive rank assignments. In instances where one or more communities have equal or similar rankings, other considerations may be used to rank the communities, such as tag score, product views, or other information stored in the electronic catalog 112. Tag scoring is described in detail in U.S. patent application Ser. No. 11/750,782 entitled "Tag Scoring for Elements Associated with a Common Tag" filed on May 8, 2007.

The community association engine 124 may apply forum limits or other diversity creating measures at 620 to ensure the communities 120 represent a diverse collection of elements, tags, categories, topics, forums, or other diversity indicators. For example, the community association engine 124 may apply a filter process to ensure that no more than half of the discussions presented on the personalized page 136 are generated from the same forum. This may be particularly important when some forums include many active discussions, such as forums for popular elements such as books, music, or other user content creating elements. The personalization manager 128 may cause the display of the communities at 622, such as a collection of discussions 624 which may be presented on the personalized page 136 for the user 202.

FIG. 7 is a flow diagram of another illustrative process 700 for determining communities that are associated with personalized data, and for determining how to score, select, and display these communities. The descriptions of some of the elements in FIG. 6 also apply to similarly-situated elements included in FIG. 7, and therefore will not be discussed again for sake of brevity. As previously discussed in FIG. 6, the community association engine 124 determines communities 120 associated with the element 114, as shown at 608, included in the process 700.

In accordance with embodiments, the community association engine 124 (at 702) assigns a community score 704 to each community associated with the element 114, the category 116, or the tag 118. The community score 704 may be any numerical or non-numerical indicator of the relevancy or some other characteristic of the community, and may be based on characteristics such as overall activity, recent activity, content quality, and popularity of the associated elements, tags, and/or categories. The community score 704 may be a non-linear score in contrast to a rank, which is typically linear and includes consistent ascending/descending values. In some embodiments, the community score 704 may be associated with a tag score, product views, or other numeric indicators. Some communities may have the same score while other communities may have vastly different ranges of community scores. In an example where the resulting associated communities includes three communities, the communities may have community scores such as 5, 6, and 19, respectively.

The community scores 704 may be normalized across the collection of elements 604 at 706 to create normalized scores 708, which enable cross element comparisons of the communities. The normalization process at 706 may include applying weights to each element in the collection of elements 604 to create the normalization score. In other embodiments, the normalization score may be based on element sales, product views, or other information. The normalized scores 708 may be constrained between a minimum and maximum normalization value, such as from zero to one hundred (0-100). In the example above, the community scores 5, 6, and 19 may be transformed into normalized scores such as 32, 32, and 41, respectively. The normalized scores may be compared across elements to analyze, sort and otherwise manipulate the communities.

In embodiments, the community association engine 124 may select communities at 710 based on the normalized scores 708. For example, a threshold normalization score may be used to reduce the number of communities for presentation on the personalized page 136, whereas only communities with a higher normalization score than the threshold may be selected by the community association engine 124 for further processing. In other embodiments, a quantity limit for the communities may be applied such that top communities may be selected until the quantity limit is attained. Communities may also be selected in a random manner or in any other manner. Finally, the communities may be displayed at 712, such as a collection of discussions 714 which may be presented on the personalized page 136 for the user 202.

Community Personalization Implementation

Figure 8:
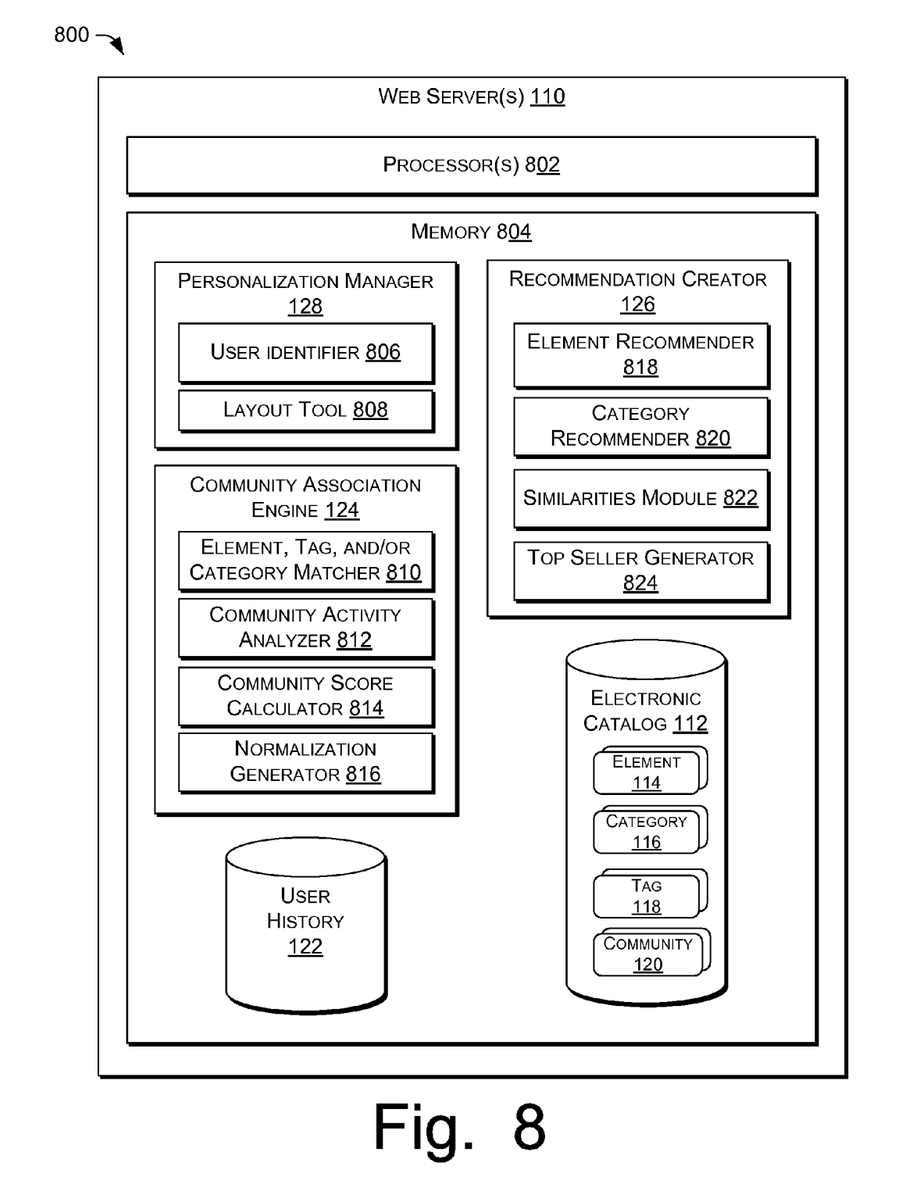
FIG. 8 is a block diagram illustrating embodiments of modules in a personalization manager, recommendation creator, and community association engine from FIG. 1.

FIG. 8 illustrates an example implementation 800 of the personalization manager 128, recommendation creator 126, and community association engine 124 that may run as software on one or more of the web servers 110(1)-(N). Alternatively, the functionality of these tools may spread across one or more other servers, computing devices, or the like. The web servers 110 have processing capabilities and memory suitable to store and execute computer-executable instructions. In this example, the web server(s) 110 include one or more processors 802 and memory 804. The memory 804 may include volatile and/or nonvolatile memory, removable and/or non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The personalization manager 128, recommendation creator 126, and community association engine 124 are implemented as software or computer-executable instructions stored in the memory 804 and executed by one or more of the processors 802. The personalization manager 128 includes a user identifier 806 and a layout tool 808 for configuring the personalized page 136. The user identifier 806 may use a login prompt to identify the user 202, or may use other identifiers such as cookie or the like to identify the user. If the user is identified, the layout tool 808 may generate the personalized page 136 using information specific to the user as illustrated in FIG. 4 and FIG. 5. If the user 202 is not identified, such as in FIG. 6, the layout tool 808 may use other information, such as top seller information, to populate the personalized page 136.

The community association engine 124 may include a multitude of modules. With use of one or more of the illustrated modules, or one or more non-illustrated modules, the community association engine 124 associates a community with information specific to the user history data 122, such as elements, categories, and/or tags stored in the electronic catalog 112. An element, tag, and/or category matcher 810 may associate an elements, tags, and categories to further associate communities to the user 202. A community activity analyzer 812 may analyze the activity occurring in a community. The activity of the communities may be used for generating a community rank 614 as described at 610 in FIG. 6.

A community score calculator 814 may determine a community score 704. For discussion purposes, community content and/or relevancy information as described with reference to block 610 in FIG. 6, may be included in the community score. Thus, the community content and/or relevancy may be evaluated by the community score calculator 814 in order to rank the community, as previously described with reference to FIG. 6. The community score may be normalized by a normalization generator 816, as described at 706 in process 700.

In embodiments, the recommendation creator 126 may also include a multitude of modules. An element recommender 818 may use the user history data 122 to generate recommendations for the user 202. In addition or alternatively, the category recommender 820 may generate category recommendations for the user 202 based on the user history data 122. In further embodiments, the recommendation creator 126 may also include modules that recommend tags, services, or other desirable items for consumption by the user. A similarities module 822 may generate other recommendations 314 as shown in FIG. 3. For example, the user's recent history may be associated with another user to generate other recommendations for the user 202. A top seller generator 824 may generate top selling elements, categories, or tags for inclusion in the personalized page 136, such as illustrated in FIG. 5 when the user is not identified by the e-commerce company.

Operation

Figure 9:
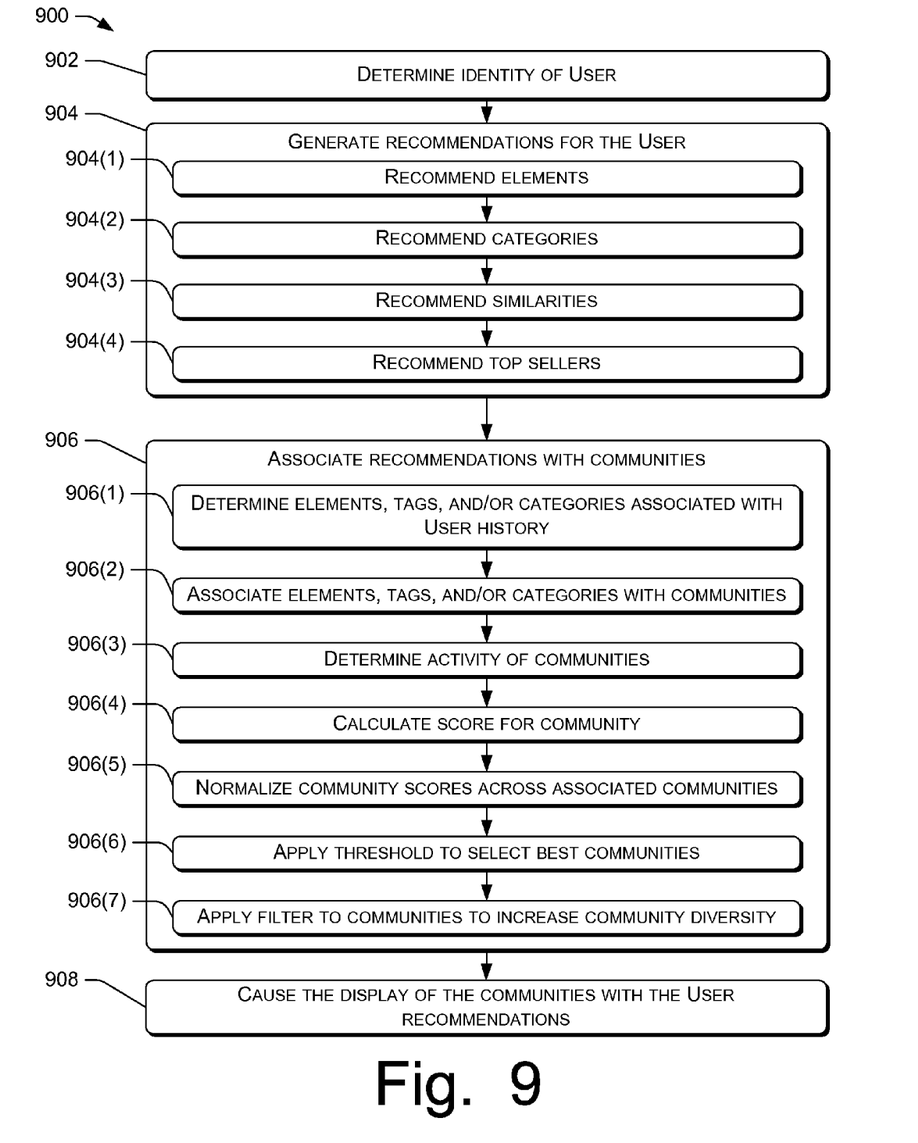
FIG. 9 is a flow diagram of a process for selecting communities based on personalization data associated with an electronic catalog website.

FIG. 9 illustrates an example process 900 for selecting communities based on personalization data. For discussion purposes, the process 900 is described with reference to the architecture 100 of FIG. 1, as well as the personalization manager 128, recommendation creator 126, and community association engine 124 of FIGS. 1 and 8. Although the process 900 is described with reference to numbered operations, the order in which the operations (or sub-operations) are described is not intended to be construed as a limitation, and any number of the described blocks can be combined in any order and/or in parallel to implement the process.

In accordance with embodiments of the process 900, the personalization manager 128 determines the identity of the user at 902, such as by a login or other identification technique. The recommendation creator 126 may create recommendations at 904 in a series of sub-operations 904(1), . . . , 904(4). The recommendations may be generated from the user history data 122 and may recommend elements at 904 (1), recommend categories at 904(2), recommend similarities at 904(3), and/or recommend top sellers at 904(4). Additional embodiments may include recommended tags or other items for the user.

The community association engine 124 may associate recommendations with communities at 906 in a series of sub-operations 906(1), . . . , 906(7). The user history data 122 may be used to determine elements, tags, and/or categories at 906(1) for the user 202. For example, the user may browse on the website 106 and view elements, tags, and categories, which are recorded in the user history data 122. In addition, product purchases, elements selected for a checkout process, or other instances of elements, tags, or categories may be stored in the user history data 122 and used in the sub-operation 906(1).

At 906(2), the elements, tags, and/or categories identified in sub-operation 906(1) are associated with communities by the community association engine 124. The activity of the communities, and more particularly the recent activity, may be analyzed at 906(3) to determine if the community is current, popular, and generally used by users.

In some embodiments, the community score 704 may be computed by the community score calculator 814 at 906(4) and normalized across the associated communities at 906(5) to enable sorting and other operations or analysis across the communities. Next, a threshold may be applied to the communities at 906(6) to select the most relevant communities which may interest users and generate user passion. For example, the threshold may be compared to the normalized score of each community. In addition, the community association engine 124 may apply a filter to the communities at 906(7) to increase community diversity in the selected communities. For example, if many of the selected communities involve the same elements, some of those communities may be replaced with communities associated with different elements to increase the diversity of the selected communities. In some instances, creating diversity in a presentation of the communities may include setting a predetermined proportional range, fixed range, or fixed community count for each source of the community association, thereby creating maximum and/or minimum limits to create a diverse community presentation.

The layout tool 808 of the personalization manager 128 may cause the display of the communities with the user recommendations at 908. For example, the selected communities may be displayed along with recommended elements, categories, and/or tags on the personalized page 136. In other embodiments, the personalization manager 128 may cause the display of the communities in other web pages within the website 106, such as introduction pages (personalized index pages). In addition or in the alternative, the personalization manager 128 may cause the display of the communities in other locations, such as personalized listing pages (e.g., registries or wishlists), on a web page accessed via an email link, or in a checkout process web page.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
identifying a collection of items associated with a user based at least in part on interaction by the user with an electronic marketplace;
determining at least one of a recommended item, a category, or a tag that is associated with an item within the collection of items;
identifying discussion forums associated with at least one of the recommended item, the category, the tag, or the collection of items, each of the discussion forums including dialog created by a plurality of users that includes discussions that are associated with the at least one of the recommended item, the category, the tag, or the collection of items;
filtering the discussion forums based at least in part on an amount of activity of each discussion forum to reduce a quantity of the discussion forums to less than a threshold quantity, wherein filtering the discussion forum further includes:
calculating a discussion score for each discussion forum, the discussion score based at least in part on content or relevance of the discussion forum to the at least one of the recommended item, the category, the tag, or the collection of items;

calculating a normalization score by applying a weight to the discussion score of each discussion forum, the weight to adjust the discussion score based on a relative frequency of the collection of items and one or more of the recommended item, the category, and the tag that are associated with the respective discussion forum; and designating discussion forums having the normalized score above a threshold score to be displayed to the user; and causing a display of the reduced quantity of the discussion forums with the items.

2. A method comprising:

identifying a collection of items associated with a user based at least in part on interaction by the user with an electronic marketplace;

determining at least one of a recommended item, a category, or a tag that is associated with an item within the collection of items;

identifying discussion forums associated with at least one of the recommended item, the category, the tag, or the collection of items, each of the discussion forums including dialog created by a plurality of users that includes discussions that are associated with the at least one of the recommended item, the category, the tag, or the collection of items;

filtering the discussion forums based at least in part on an amount of activity of each discussion forum to reduce a quantity of the discussion forums to less than a threshold quantity, wherein filtering the discussion forums further includes:

ranking the discussion forums based on recent activity in the discussion forums;

selecting ranked discussion forums above a threshold rank; and filtering the ranked discussion forums to maintain a predetermined mix of the discussion forums associated with the collection of the items and the discussion forums associated with the at least one of the recommended item, the category, or the tag; and causing a display of the reduced quantity of the discussion forums with the items.

3. One or more non-transitory computer-readable media storing computer-executable instructions that, when executed on one or more processors, performs acts comprising:

creating, after determining a user, a personalized page for the user that includes a collection of elements and discussion forums associated with the collection of elements, wherein the creating includes:

tracking user interaction with elements available to the user from a host of an electronic catalog;

associating the collection of elements with (1) elements acquired by the user based in part on a determination that the user has acquired elements from the host and (2) elements viewed by the user;

filtering the discussion forums associated with the collection of elements, wherein filtering the discussion forums includes:

ranking the discussion forums based on recent activity in the discussion forums;

selecting ranked discussion forums above a threshold rank; and filtering the ranked discussion forums to maintain a predetermined measure of diversity of discussion forums associated with the elements acquired by the user and discussion forums associated with the elements viewed by the user; and outputting at least the filtered discussion forums on the personalized page.

4. The one or more non-transitory computer-readable media as recited in claim 3, further comprising creating an anonymous personalized page for an unknown user that includes another collection of elements and other discussion forums associated with the other collection of elements prior to the determination of the user, the creating to include identifying the other discussion forums associated with the other collection of elements based at least in part on at least one of upstream customer activity, time of day, or element popularity.

5. The one or more non-transitory computer-readable media as recited in claim 3, wherein ranking the discussion forums is further based on a date of a most recent post in each of the discussion forums.

6. The one or more non-transitory computer-readable media as recited in claim 3, wherein ranking the discussion forums is based on a number of reply posts in each of the discussion forums.

7. One or more non-transitory computer-readable media storing computer-executable instructions that, when executed on one or more processors, performs acts comprising:

creating, after determining a user, a personalized page for the user that includes a collection of elements and discussion forums associated with the collection of elements, wherein the creating includes:

tracking user interaction with elements available to the user from a host of an electronic catalog;

associating the collection of elements with (1) elements acquired by the user based in part on a determination that the user has acquired elements from the host or (2) elements viewed by the user;

selecting the discussion forums associated with the collection of elements, the discussion forums selected based at least on recent activity in the discussion forum, the selected discussion forums to be included in the personalized page, wherein the selecting the discussion forums includes:

generating a score for each discussion forum associated with an element in the collection of elements;

calculating a normalization score by applying a weight to the score of each discussion forum, the weight to adjust the score based on a relative frequency of the collection of elements; and designating the discussion forums with the normalized score exceeding a threshold value for display in the personalized page; and outputting at least the selected discussion forums on the personalized page.

8. A computer system, comprising:

one or more processors; and memory to store instructions that, when executed, cause the one or more processors to perform acts comprising:

a recommendation creator stored in the memory and executable by the one or more processors to store interactions with a user, the interactions including interactions with elements in an electronic catalog, and to recommend additional elements associated with the elements in the electronic catalog based at least in part on the interactions with the user;

a community association engine stored in the memory and executable by the one or more processors to select a subset of discussion forums associated with at least one of the recommended elements, individual ones of the subset of discussion forums including dialog created by a plurality of users that includes opinions that are associated with the at least one of the recommended elements, wherein the community association engine selects the subset of discussion forums by:
generating a score for individual discussion forums of the subset of discussion forums;
calculating a normalization score for the individual discussion forums by applying a weight to the score of the individual discussion forums, the weight to adjust the score based on a relative frequency of the recommended elements; and
selecting one or more of the individual discussion forums having an associated normalization score above a threshold score; and
a personalization manager stored in the memory and executable by the one or more processors to present a personalized page including the one or more of the individual discussion forums selected.

9. The computer system as recited in claim 8, wherein the personalized page includes recommended elements and recommended categories.

10. The computer system as recited in claim 8, wherein the personalized page includes the one or more of the individual discussion forums selected, sorted based in part on recent activity or a number of posts in each discussion forum.

11. The computer system as recited in claim 8, wherein the personalized page further comprises a tag portion to display a tag associated with the recommended elements.

12. One or more non-transitory computer-readable media storing computer-executable instructions that, when executed on one or more processors, configure a computer to perform the method as recited in claim 1.

13. One or more non-transitory computer-readable media storing computer-executable instructions that, when executed on one or more processors, configure a computer to perform the method as recited in claim 2.

14. A method comprising:
creating, after determining a user, a personalized page for the user that includes a collection of elements and discussion forums associated with the collection of elements, wherein the creating includes:
tracking user interaction with elements available to the user from a host of an electronic catalog;
associating the collection of elements with:
elements acquired by the user based in part on a determination that the user has acquired elements from the host, and
elements viewed by the user;
filtering the discussion forums associated with the collection of elements, wherein filtering the discussion forums includes:
ranking the discussion forums based on recent activity in the discussion forums;
selecting ranked discussion forums above a threshold rank; and
filtering the ranked discussion forums to maintain a predetermined measure of diversity of discussion forums associated with the elements acquired by the user and discussion forums associated with the elements viewed by the user; and
outputting at least the filtered discussion forums on the personalized page.

15. The method as recited in claim 14, further comprising creating an anonymous personalized page for an unknown user that includes another collection of elements and other discussion forums associated with the other collection of elements prior to the determination of the user, the creating to include identifying the other discussion forums associated with the other collection of elements based at least in part on at least one of upstream customer activity, time of day, or element popularity.

16. The method as recited in claim 14, wherein ranking the discussion forums is based on a date of a most recent post in each of the discussion forums.

17. The method as recited in claim 16, wherein ranking the discussion forums is based on a number of reply posts in each of the discussion forums.

18. A method comprising:
creating, after determining a user, a personalized page for the user that includes a collection of elements and discussion forums associated with the collection of elements, wherein the creating includes:
tracking user interaction with elements available to the user from a host of an electronic catalog;
associating the collection of elements with:
elements acquired by the user based in part on a determination that the user has acquired elements from the host, or
elements viewed by the user;
selecting the discussion forums associated with the collection of elements, the discussion forums selected based at least on recent activity in the discussion forums, the selected discussion forums to be included in the personalized page, wherein the selecting the discussion forums includes:
generating a score for each discussion forum associated with an element in the collection of elements;
calculating a normalization score by applying a weight to the score of each discussion forum, the weight to adjust the score based on a relative frequency of the collection of elements; and
designating the discussion forums with the normalized score exceeding a threshold value for display in the personalized page; and
outputting at least the selected discussion forums on the personalized page.

19. One or more non-transitory computer-readable media storing computer-executable instructions that, when executed on one or more processors, configure a computer to perform the method as recited in claim 14.

20. One or more non-transitory computer-readable media storing computer-executable instructions that, when executed on one or more processors, cause the one or more processors to execute modules comprising:
a recommendation creator stored in the memory and executable by the one or more processors to store interactions with a user, the interactions including interactions with elements in an electronic catalog, and to recommend additional elements associated with the elements in the electronic catalog based at least in part on the interactions with the user;
a community association engine stored in the memory and executable by the one or more processors to select a subset of discussion forums associated with at least one of the recommended elements, individual ones of the discussion forums including dialog created by a plurality of users that includes opinions that are associated with the at least one of the recommended elements, wherein the community association engine selects the subset of discussion forums by:
generating a score for individual discussion forums of the subset of discussion forums;
calculating a normalization score for the individual discussion forums by applying a weight to the score of the individual discussion forums, the weight to adjust the score based on a relative frequency of the recommended elements; and selecting one or more of the individual discussion forums having an associated normalization score above a threshold score; and a personalization manager stored in the memory and executable by the one or more processors to present a personalized page including the one or more of the individual discussion forums selected.

21. The one or more non-transitory computer-readable media as recited in claim 20, wherein the personalized page includes recommended elements and recommended categories.

22. The one or more non-transitory computer-readable media as recited in claim 20, wherein the personalized page includes the one or more of the individual discussion forums selected, sorted based in part on recent activity or a number of posts in each discussion forum.

23. The one or more non-transitory computer-readable media as recited in claim 20, wherein the personalized page further comprises a tag portion to display a tag associated with the recommended elements.

* * * * *